(12) United States Patent
Huang et al.

(10) Patent No.: US 10,976,607 B2
(45) Date of Patent: Apr. 13, 2021

(54) ELECTRONIC DEVICE

(71) Applicant: InnoLux Corporation, Miao-Li County (TW)

(72) Inventors: Wen-Cheng Huang, Miao-Li County (TW); Ting-Sheng Chen, Miao-Li County (TW); Chia-Chun Yang, Miao-Li County (TW); Chin-Cheng Kuo, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/699,978

(22) Filed: Dec. 2, 2019

(65) Prior Publication Data

US 2020/0201121 A1 Jun. 25, 2020

(30) Foreign Application Priority Data

Dec. 21, 2018 (CN) .......................... 201811570754.5

(51) Int. Cl.
*G02F 1/13357* (2006.01)
(52) U.S. Cl.
CPC .. *G02F 1/133608* (2013.01); *G02F 1/133603* (2013.01); *G02F 2202/28* (2013.01)

(58) Field of Classification Search
None
See application file for complete search history.

(56) References Cited

U.S. PATENT DOCUMENTS

| 2008/0074036 | A1* | 3/2008 | Wang | H01L 51/5246 |
| | | | | 313/504 |
| 2016/0113106 | A1* | 4/2016 | Kim | G02F 1/1333 |
| | | | | 361/749 |
| 2019/0243412 | A1* | 8/2019 | Siddiqui | G06F 1/1637 |
| 2020/0233258 | A1* | 7/2020 | Araki | H05K 5/03 |

* cited by examiner

*Primary Examiner* — Richard H Kim
(74) *Attorney, Agent, or Firm* — McClure, Qualey & Rodack, LLP

(57) ABSTRACT

An electronic device is provided, including a frame, a working panel and a cover plate. The frame includes a sidewall, and the sidewall includes an outer surface. At least a part of the working panel is disposed in the frame. The cover plate is disposed on the working panel and includes a surface, wherein a surface of the cover plate and an outer surface of the sidewall of the frame are fixed by using an adhesive, and the extension direction of the surface of the cover plate is different than the extension direction of the outer surface of the sidewall of the frame.

7 Claims, 11 Drawing Sheets

ELECTRONIC DEVICE

CROSS-REFERENCE TO RELATED APPLICATIONS

The present application claims priority to China Patent Application No. 201811570754.5, filed on Dec. 21, 2018, which is incorporated by reference herein in its entirety.

BACKGROUND

Field

The disclosure relates to an electronic device.

Description of the Related Art

Nowadays, electronic devices are widely used. They include notebooks, mobile phones, digital cameras, and personal digital assistants. An electronic device provides light to a working panel through a backlight module for displaying images, or for adjustment. In general, the working panel and the backlight module of the electronic device are positioned between a frame and a cover plate to limit the position of the working panel and the backlight module, and to protect the working panel and the backlight module. In the electronic devices that are currently available on the consumer market, the working panel and the backlight module are affixed using tape, which is not applicable for use in an automatic production process.

SUMMARY

An electronic device is provided in some embodiments, including a frame, a working panel, and a cover plate. The frame includes a sidewall, and the sidewall includes an outer surface. At least a part of the working panel is disposed in the frame. The cover plate is disposed on the working panel and includes a surface, wherein a surface of the cover plate and an outer surface of the sidewall of the frame are fixed by using an adhesive, and the extension direction of the surface of the cover plate is different from the extension direction of the outer surface of the sidewall of the frame.

In the electronic device according to some embodiments of the present disclosure, the thickness of the adhesive that is adjacent to the cover plate is greater to the thickness of the adhesive that is far from the cover plate. The electronic device further includes a case disposed in the frame, and at least a portion of the adhesive contacts the case. In a cross-sectional view, the length of the adhesive along a first direction is greater than or equal to 50% of the length of the outer surface of the side wall in the first direction. The side wall of the frame further includes a first sub-side wall and a second sub-side wall. The first sub-side wall extends in a first direction. The second sub-side wall extends from an end of the first sub-side wall in a second, wherein the first direction is opposite to the second direction, and the length of the second sub-side wall is less than the length of the first sub-side wall. The adhesive includes a first portion and a second portion. The first portion is positioned at one side of the outer surface of the side wall that is far from the panel, the second portion is positioned at one side of the outer surface of the side wall that is adjacent to the panel, and the first portion and the second portion are positioned at opposite sides of an extension line. The thickness of the first portion that is in contact with the cover plate is between 0.1 mm and 0.8 mm. The thickness of the second portion that is in contact with the cover plate is between 0.1 mm and 1.0 mm.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
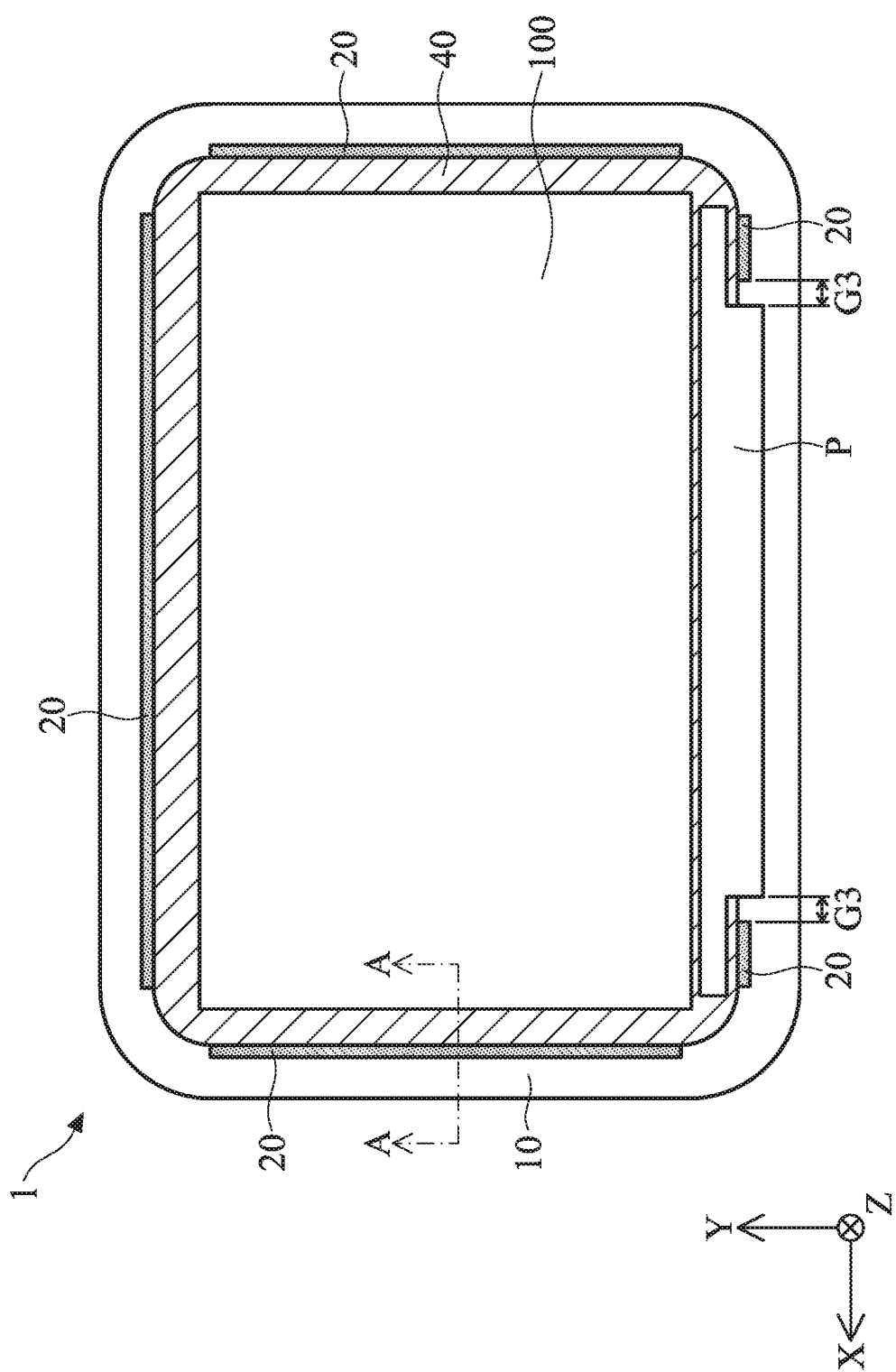
FIG. 1 is a schematic view of an electronic device in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The term "about" as used herein indicates the value of a given quantity that can vary based on a particular technology node associated with the subject electronic device. Based on the particular technology node, the term "about" can indicate a value of a given quantity that varies within, for example, 10-30% of the value (e.g., ±10%, ±20%, or ±30% of the value).

FIG. 1 is a schematic view of an electronic device 1 in some embodiments of the present disclosure. The electronic device 1 includes a cover plate 10, adhesive 20 and a frame 40, wherein the frame 40 may be disposed in the cover plate 10, and the adhesive 20 is disposed between the cover plate 10 and the frame 40. In this embodiment, the length of the frame 40 (such as measured in X or Y direction) is less than the length of the cover plate 10, but the present disclosure is not limited thereto. In some embodiments, the length of the frame 40 may be identical to the length of the cover plate 10, and is not limited thereto. A circuit board P may be disposed adjacent to the frame 40. The circuit board P may be a printed circuit board (PCB) or a flexible printed circuit (FPC), but the present disclosure is not limited thereto.

Furthermore, although the cover plate 10 and the frame 40 are shown as a rectangle having rounded corners, but the shape of the cover plate 10 and the frame 40, which are parts of the electronic device 1, are not limited thereto. The shape of the cover plate 10 and the frame 40 may be triangular, prismatic, trapezoid, wedge, other polygons or an irregular shape having an arc edge, and the shape of the cover plate 10 may be different from the shape of the frame 40. The frame 40 may be partially hollowed to reduce the overall weight of the electronic device 1. In this embodiment, the shape of the hollow portion of the frame 40 is rectangular and a working module 100 is exposed from the hollow portion, but is not limited thereto. The electronic device in this embodiment may be a display device, an antenna device or other electronic devices.

Figure 2:
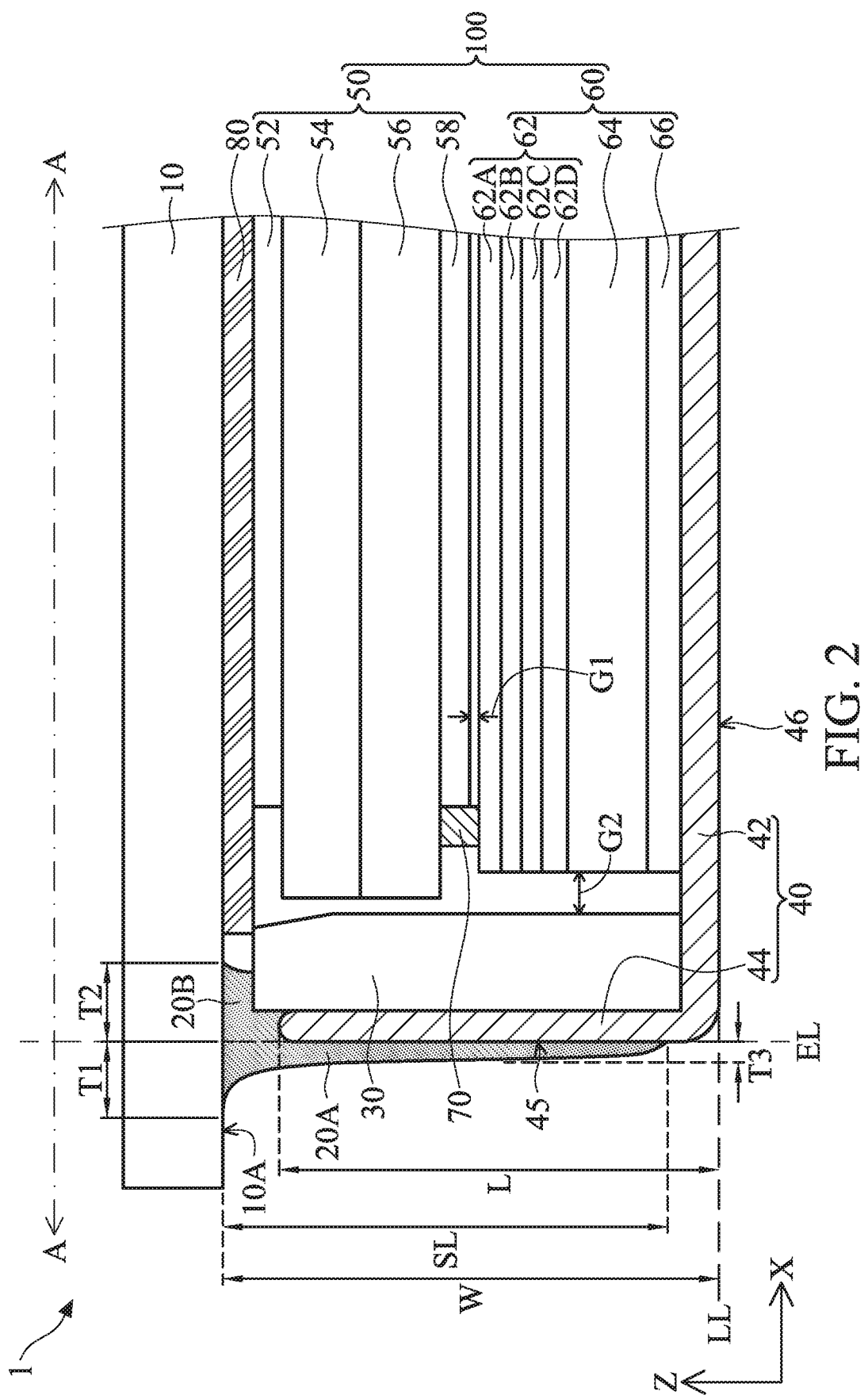
FIG. 2 is a cross-sectional view of an electronic device in some embodiments of the present disclosure.

FIG. 2 is a cross-sectional view of the electronic device 1 illustrated along the line A-A in FIG. 1. In FIG. 2, besides the cover plate 10, the adhesive 20, the frame 40 and the working module 100, the electronic device 1 may optionally further include at least one of an adhesive layer 80, a spacer 70 or a case 30. The working module 100 further includes a working panel 50 and a backlight module 60. The case 30, the working panel 50 and the backlight module 60 are disposed between the cover plate 10 and the frame 40, and the working panel 50 may be optionally and at least partially disposed in the frame 40 and adjacent to the cover plate 10. The spacer 70 is disposed between the working panel 50 and the backlight module 60 to allow a gap G1 formed between the working panel 50 and the backlight module 60 to prevent the working panel 50 from colliding with the backlight module 60, which may cause damage to the working panel 50 or the backlight module 60. The cover plate 10 is fixed to the working panel 50 through the adhesive layer 80. In this embodiment, the adhesive layer 80 may optionally be in contact with the case 30. In other embodiments, coating or decorative layer may be disposed on the case 30, and the adhesive 80 is in contact with the coating or the decorative layer, which may be altered depending on design requirements and is not limited thereto. Furthermore, a gap is formed between the case 30 and the working panel 50 and between the case 30 and the backlight module 60 to prevent the case 30 from colliding the working panel 50 and the backlight module 60 as well as to prevent damage from occurring, or to provide space for compensating the tolerance during assembling the electronic device 1. For example, in this embodiment, a gap G2 is formed between the case 30 and the backlight module 60. In this embodiment, the frame 40 includes a back plate 42 and a side wall 44, wherein the extension direction of the back plate 42 is parallel to the extension direction of the cover plate 10, and the extension direction of the side wall 44 is different than the extension direction of the back plate 42. The side wall 44 includes an outer surface 45 facing away from the working panel 50. In other words, the normal vector of the outer surface 45 does not oriented to the working panel 50. The back plate 42 includes a surface 46 facing away from the working panel 50. In other words, the normal vector of the surface 46 is not oriented to the working panel 50. In this embodiment, the extension direction of the side wall 44 is perpendicular to the extension direction of the back plate 42, but the present disclosure is not limited thereto. In some embodiments, the angle between the side wall 44 and the back plate 42 may be greater than 90 degrees or less than 90 degrees, depending on design requirements.

The cover plate 10 may be any transparent or rigid material, such as glass, quartz, ceramic, sapphire or plastic, etc., to allow light to pass through, or to protect other elements of the electronic device 1, but the present disclosure is not limited thereto. The cover plate 10 includes a surface 10A which may be fixed to the side wall 44 of the frame 40 by using the adhesive 20. In this embodiment, the adhesive 20 may be in contact with the surface 10A of the cover plate 10 and a portion of the outer surface 45 of the side wall 44 of the frame 40. In this embodiment, the surface 10A faces to the working panel 50. In other words, the normal vector of the surface 10A is oriented to the working panel 50, and the extension direction of the surface 10A of the cover plate 10 is different than the extension direction of the outer surface 45 of the side wall 44. In this embodiment, the extension direction of the surface 10A of the cover plate 10 is perpendicular to the extension direction of the outer surface 45 of the side wall 44, but the present disclosure is not limited thereto. In some embodiments, the surface 10A may be parallel to the working panel 50, and is not limited thereto. Furthermore, in the cross-sectional view illustrated in FIG. 2, an extension line LL extends from the surface 46 of the back plate 42, and the side wall 44 has a length L calculated from a bottom end (i.e. the extension line LL) to an uppermost end along a first direction (e.g. Z direction), and the adhesive 20 has a length SL calculate from the bottom end (i.e. the extension line LL) to an uppermost end (such as the surface 10A of the cover plate 10) along the first direction. Along the first direction, the length SL of the adhesive 20 may be greater than or equal to 50% of the length L of the side wall 44 to enhance the strength of the attachment. In another embodiment, the adhesive 20 covers at least 50% of the area of the outer surface 45 of the side wall 44 of the frame 40. It should be noted that the working panel 50 and at least a portion of the spacer 70 may be fixed using the adhesive 20 as well to finish the assembly of the electronic device 1. The adhesive 20 may include flowable glue, or may include pressure sensitive adhesive, heat curing adhesive, light curing adhesive, hot melt adhesive, moisture curing adhesive, AB glue, etc., but the present disclosure is not limited thereto. The adhesive 20 may be in contact with the case 30 or the adhesive layer 80, and is not limited thereto. In this embodiment, the adhesive 20 may be in contact with at least a portion of the case 30 without contacting the adhesive layer 80. In other embodiments, the case 30 may optionally be omitted, so the adhesive 20 may be in contact with at least a portion of the adhesive layer 80 or a polarizing layer 52.

The working module 100 may be an antenna module or a display module. If the working module 100 is a display module, the working module 100 may include, for example, a liquid-crystal display module, an organic light-emitting diode (OLED) module, a QD light-emitting diode (QLED) module, or a light-emitting diode (LED) module. The aforementioned light-emitting diode modules may include micro light-emitting diode (micro LED) or mini light-emitting diode (mini LED), depending on their size. The size of the mini LED may be between about 100 µm to about 300 µm, and the size of the micro LED may be between about 1 µm to about 100 µm, but the present disclosure is not limited thereto. In some embodiments, the working panel 50 may include at least a panel and a display media disposed on the panel, and a polarization layer may be optionally disposed thereon, and is not limited. In an embodiment, the working panel 50 may include a polarizing layer 52 and a panel 54, and may further optionally include a panel 56 and a polarization layer 58. In some embodiments of the present disclosure, the working panel 50 may optionally include a liquid crystal (LC), a quantum dot (QD), a fluorescence molecule, a phosphor molecule, an organic light-emitting diode, an inorganic light-emitting diode, another display media, or a combination thereof, but the present disclosure is not limited thereto. In some embodiments, the working panel 50 may be a flexible display, a touch display, a curved display, or a free shape display, but the present disclosure is not limited thereto.

If the working module 100 is an antenna module, the working panel 50 may include at least a panel and a wavelength modulation media, and a working unit may be disposed on the substrate to control the transfer or conversion of the wavelength. The wavelength modulation media may be a liquid-crystal layer, for example.

In general, the polarizing layer 52 and the polarization layer 58 may be soft thin film. In this disclosure, the polarizing layer 52 and the polarization layer 58 may be disposed on opposite sides of panel 54 and panel 56. The panel 54 may be a panel with a light-filtering function to allow light of a specific wavelength to pass through, for example. A plurality of thin-film transistors (TFT, not shown) may be disposed on the panel 56, and the panel 56 may include a top gate thin film transistor, a bottom gate thin film transistor, or a dual-gate thin-film transistor (DGTFT) made from a semiconductor layer including, for example, amorphous silicon, low temperature poly-silicon (LTPS) or metal oxide.

Depending on design requirements, the lengths (e.g. along X direction) of the panel 54 and the panel 56 may be identical or different, and the polarizing layer 52 and the polarization layer 58 (e.g. along X direction) may also be identical or different, and is not limited thereto. In this embodiment, the length of the panel 56 is identical to the length of the panel 54, and the length of the polarization layer 58 is identical to the length of the polarizing layer 52. In an embodiment, the length of the panel 56 is different than the length of the panel 54, or the length of the polarization layer 58 is different than the length of the polarizing layer 52, depending on design requirements.

The adhesive layer 80 may be any suitable transparent adhesive material, or may include optical adhesive, hydrogel, or thermosetting adhesive, but the present disclosure is not limited thereto. Furthermore, the length (such as along the X direction in the cross-sectional view) of the adhesive layer 80 in the present disclosure may be adjusted depending on design requirements. In this embodiment, the length of the adhesive layer 80 is greater than the length of the polarizing layer 52, and the length of the adhesive layer 80 is equal to the length of the polarizing layer 52 in other embodiments, depending on design requirements.

The backlight module 60 includes an optical film assembly 62, an optical element 64 and a reflective layer 66 arranged in order. The optical film assembly 62, and optical element 64 and the reflective layer 66 may be stacked or suitable adhesive material may be provided to affix the elements, and is not limited in the present disclosure. The optical film assembly 62 is adjacent to the working panel 50, and the optical element 64 is disposed between the optical film assembly 62 and the reflective layer 66.

The optical film assembly 62 may include at least one layer of optical film. In this embodiment, the optical film assembly 62 may include an optical film 62A, an optical film 62B, an optical film 62C and an optical film 62D, and the number, the arrangement, and the assembly of the optical films may be determined by design requirements. For example, the optical film assembly may be prism film, diffuser film, dual brightness enhancement film (DBEF), quantum dot film, etc., and is not limited thereto. Furthermore, the optical film assembly 62 may be hanged, glued or provided by other manners.

The optical element 64 may be a poly(methyl methacrylate) (PMMA) light guide plate having a refractive index of about 1.49, a cyclo-olefin polymer (COP) light guide plate having a refractive index of about 1.53, a polycarbonate (PC) light guide plate having a refractive index of about 1.58, a polystyrene (PS) light guide plate having a refractive index of about 1.6, a styrene-methyl methacrylate copolymer (MS) light guide plate having a refractive index of about 1.53, a glass light guide plate having a refractive index of about 1.50, or another suitable light guide plate, but the present disclosure is not limited thereto.

The reflective layer 66 and the working panel 50 are disposed on opposite sides of the optical element 64. In some embodiments, the reflective layer 66 may be disposed under the optical element 64 to allow the light emitted from a light source (not shown) be reflected by the reflective layer 66 into the optical element 64 to reduce light energy loss. In some embodiments, the area of the reflective layer 66 may be greater than or equal to the area of a display region (not shown) of the working panel 50. The light source may be a direct back-lit light source or an edge back-lit light source. If the light source is a direct back-lit light source, the optical element 64 may be optionally omitted, but is not limited thereto.

The frame 40 may be used to fix and accommodate the backlight module 60 and the working panel 50. The case 30 may be used with the frame 40 to limit the position of the backlight module 60 and/or the working panel 50. The case 30 may be optionally omitted to achieve a thinner and lighter electronic device. The materials of the case 30 and the frame 40 may be plastic, metal, resin, foam, silicone, rubber, other materials, or a combination thereof, and is not limited thereto. The material of the case 30 may be identical to or different than the material of the frame 40. Because the cover plate 10 and the frame 40 are fixed by using the adhesive 20, the electronic device 1 may be manufactured using a suitable apparatus to simplify the process, and it is applicable for use in the automatic manufacturing of the apparatus. For example, the adhesive 20 may be provided by a dispenser or a knife coating gluing apparatus, which will be described later, but the present disclosure is not limited thereto. Furthermore, because the adhesive 20 is disposed on the surface 10A of the cover plate 10 and the side wall 44 of the frame 40 and is exposed from the electronic device 1, the adhesive 20 may optionally have color or pattern. As a result, the adhesive 20 may be an appearance element to achieve decorative function.

A portion of the adhesive 20 that is used to fix the cover plate 10 to the frame 40 may flow along a direction (e.g. X direction) to enter a position between the cover plate 10 and the case 30, so the fixative strength between the case 30 and the cover plate 10 may be strengthened even further. As a result, the thickness (e.g. in X direction) of the portion of the adhesive 20 that is adjacent to the cover plate 10 is greater than the thickness (e.g. in X direction) of the portion of the adhesive 20 that is far from the cover plate 10. In this embodiment, the surface 10A of the cover plate 10 has a normal direction in the cross-sectional view, and the thickness direction is a direction perpendicular to the normal direction. In this embodiment, as shown in FIG. 2, the adhesive 20 may have a first portion 20A and a second portion 20B that are separated by an extension line EL extended from the outer surface 45 of the side wall 44, wherein the first portion 20A is far from the working panel 50, and the second portion 20B is adjacent to the working panel 50. The first portion 20A and the second portion 20B are positioned at opposite sides of the extension line EL. The first portion 20A contacts the surface 10A of the cover plate 10, and a portion of the first portion 20A that is in contact with the surface 10A has a thickness T1 in a direction (e.g. X direction). The second portion 20B of the adhesive 20 contacts the surface 10A of the cover plate 10, and a portion of the second portion 20B that is in contact with the surface 10A has a thickness T2 in a direction (e.g. X direction). The adhesive 20 contacts the side wall 44 of the frame 40 and has a thickness T3 in a direction (e.g. X direction). In this embodiment, the thickness T3 is measured at a position about half of the length L of the side wall 44. As a result, the thickness of the portion of the adhesive 20 that is in contact with the surface 10A of the cover plate (e.g. thickness T1+T2) may be greater than the thickness of the portion of the adhesive 20 that is in contact with the outer surface 45 of the side wall 44 of the frame 40 (e.g. thickness T3). In this embodiment, the thickness T1 may be between about 0.1 mm to about 0.8 mm, the thickness T2 may be between about 0.1 mm to about 1.0 mm. In this embodiment, a distance W between the back plate 42 of the frame 40 to the surface 10A of the cover plate 10 may be between about 0.3 mm to about 2.5 mm, but the present disclosure is not limited thereto. Furthermore, the ratio of the thicknesses T1 to T2 may be between about 0.5 to about 3 to achieve a fixative function without increasing the length of the cover plate 10 (e.g. in X direction). The ratio of the thickness T1 to the distance W may be between about 1 to about 8 to achieve a fixative function without increasing the length of the side wall 44 (e.g. in Z direction). However, the present disclosure is not limited thereto, the thicknesses T1, T2 and T3 may be adjusted according to various design requirements to enhance attaching strength or to meet narrow frame requirement of the product. Furthermore, the portion of the adhesive 20 that is in contact with the cover plate 10 is arc-shaped and may be convex or concave, so decorative function may be achieved, user may be prevented from getting injured, but the present disclosure is not limited thereto.

At least of a portion of the spacer 70 may be disposed between the working panel 50 and the backlight module 60 to form a gap G1 between the working panel 50 and the backlight module 60. The spacer 70 is used for supporting the working panel 50 on the backlight module 60 to protect the working panel 50 and the backlight module 60. In this embodiment, the spacer 70 may be in direct contact with, or may be fixed on, the working panel 50 and the backlight module 60. For example, the spacer 70 may be in direct contact with the panel 56 and the optical film assembly 62. In some embodiments, the spacer 70 may be in direct contact with the polarization layer 58 as well. In some embodiments, as shown in FIG. 2, a side of the spacer 70 facing the side wall 44 is misalign with a side of the optical film assembly 62 facing the side wall 44, but the present disclosure is not limited thereto. In some embodiments, the spacer 70 may be adhesive, resin, foam, silicone, rubber, plastic or a combination thereof, depending on actual application and is not limited thereto. The adhesive may be a double-sided tape or glue. In another embodiment, the spacer 70 may be rigid, compressible, or having decorative pattern. Moreover, the spacer 70 may be linear shaped, T-shaped, L-shaped, or may have other shapes, depending on actual application and the present disclosure is not limited thereto. Furthermore, the spacer 70 may be provided separately or continuously in a top view (not shown), depending on actual application. For example, the spacer 70 may be disposed on opposite sides of the electronic device 1 in a direction (e.g. X or Y direction) to reduce the cost and simplify the process, depending on design requirements.

Figure 3A:
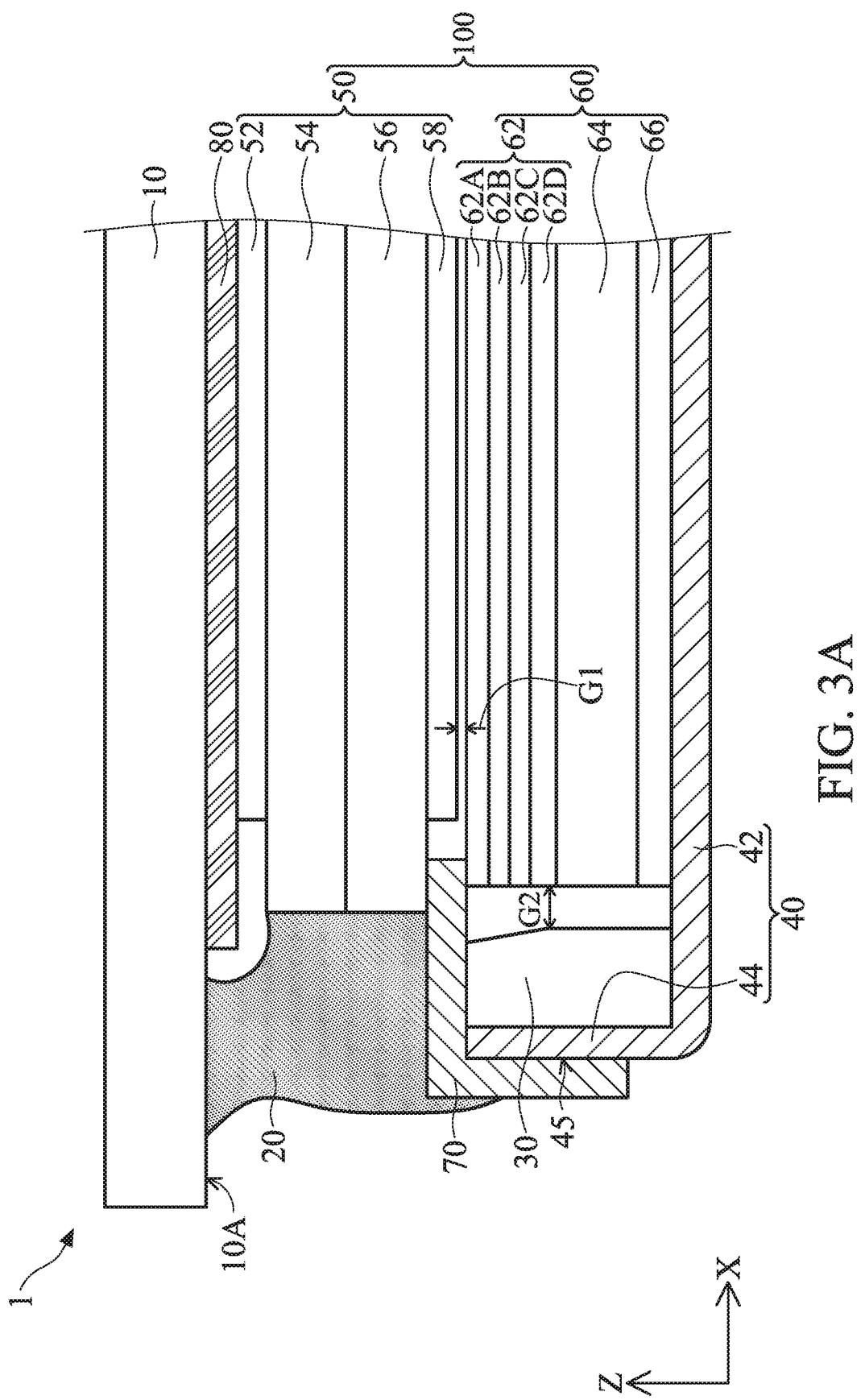
FIG. 3A is a cross-sectional view of an electronic device in some embodiments of the present disclosure.
Figure 3B:
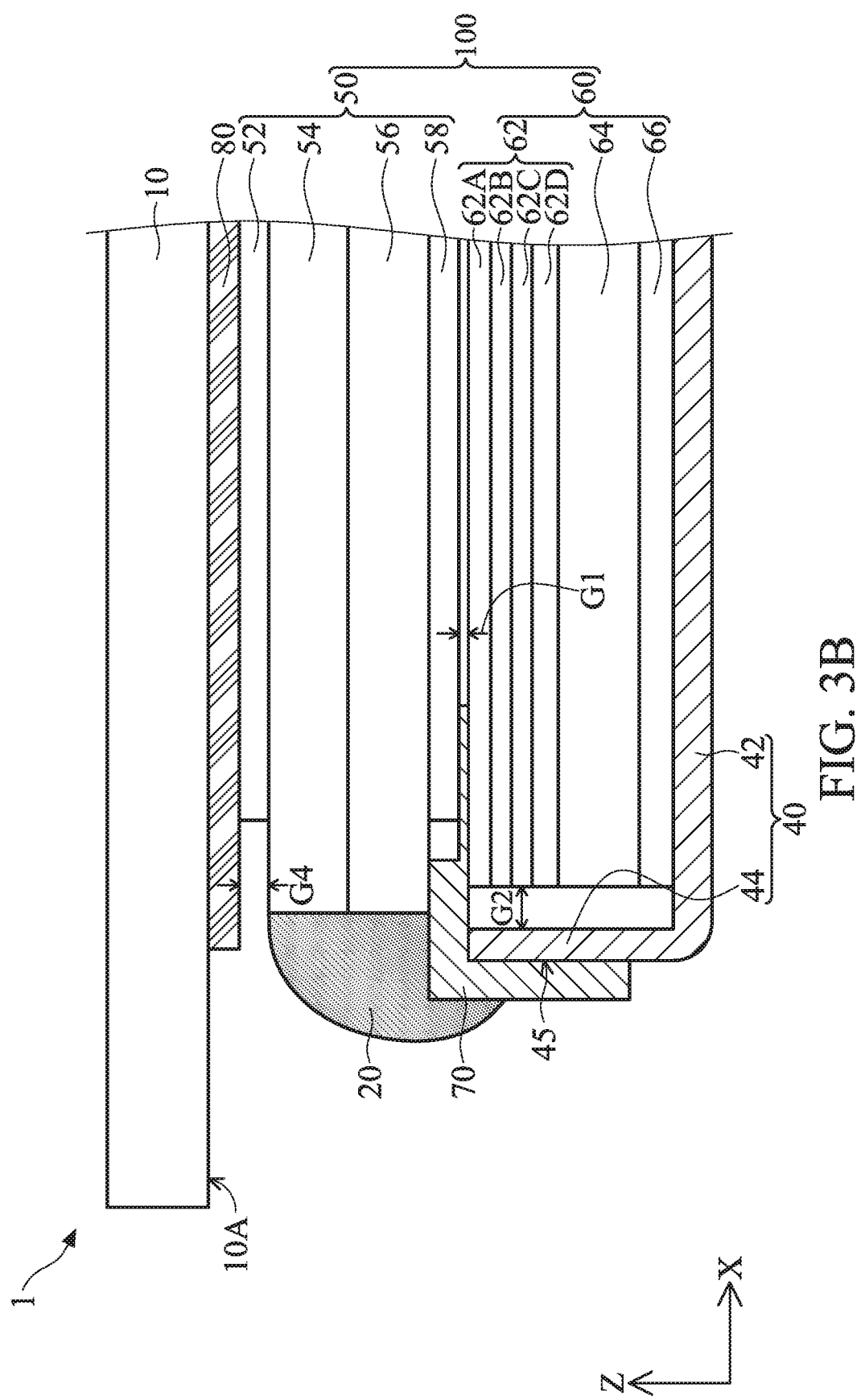
FIG. 3B is a cross-sectional view of an electronic device in some embodiments of the present disclosure.
Figure 4:
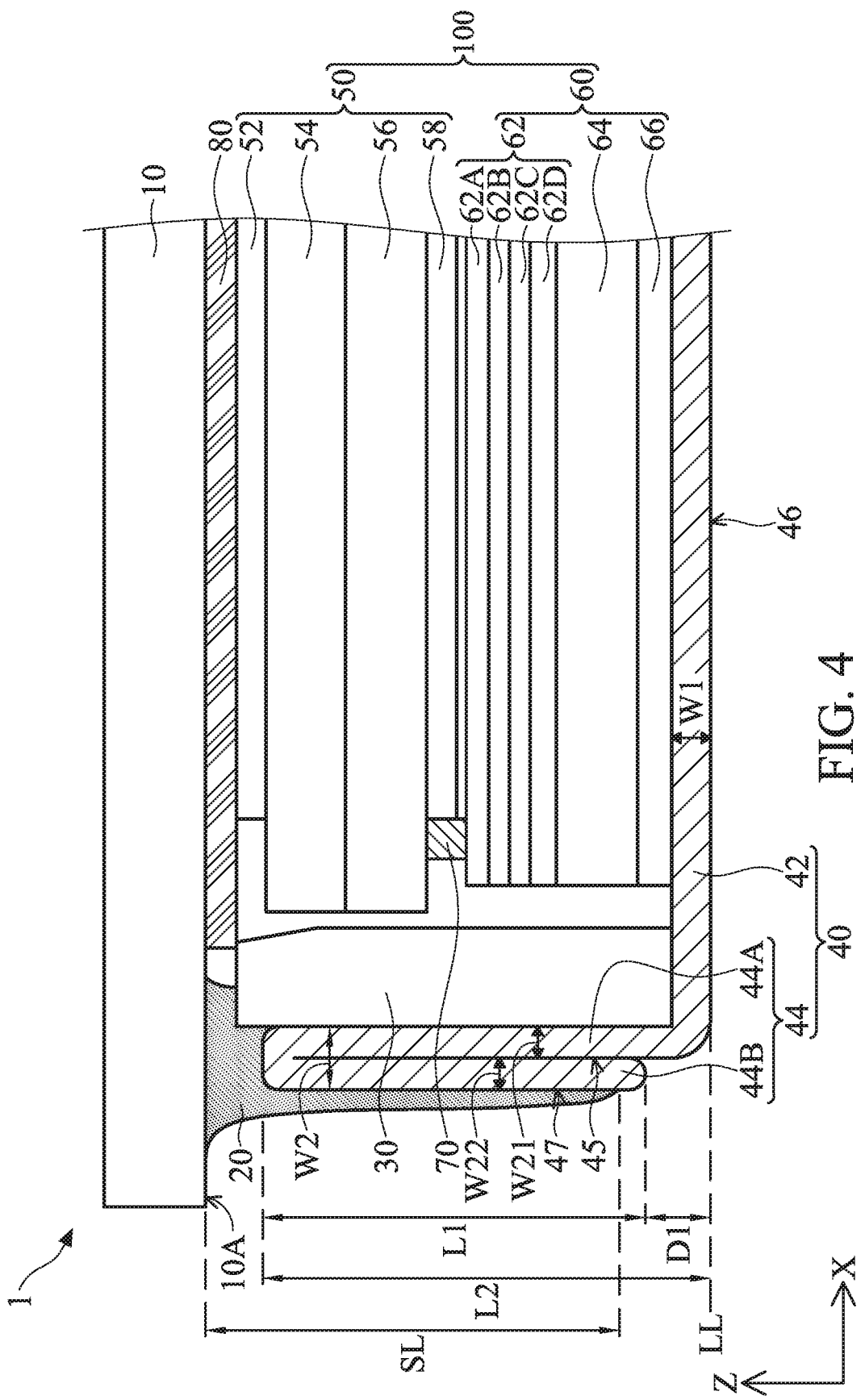
FIG. 4 is a cross-sectional view of an electronic device in some embodiments of the present disclosure.

If the spacer 70 is L-shaped, a portion of the spacer 70 is disposed between the working panel 50 and the backlight module 60, and the working panel 50 and the spacer 70 may be fixed by using the adhesive 20. As shown in FIG. 3A, in this embodiment, a portion of the spacer 70 that is adjacent to the working panel 50 is disposed on the panel 56 and the optical film assembly 62, and a portion of the spacer 70 that is far from the working panel 50 is disposed on the outer surface 45 of the side wall 44 of the frame 40, and is not limited thereto. It should be noted that the working panel 50 is disposed between the back plate 42 of the frame 40 and the cover plate 10, but the working panel 50 is not disposed in the side wall 44 of the frame 40, and the adhesive 20 may be in contact with the cover plate 10, panel 54, and panel 56 in this embodiment. In some embodiments, the adhesive 20 may also be in contact with the adhesive layer 80, or the spacer 70 may also be in contact with the case 30, and the present disclosure is not limited thereto. In another embodiment, the adhesive 20 contacts the panel 54, the panel 56, and the spacer 70 without contacting the surface 10A of the cover plate 10 in the electronic device 1, as shown in FIG. 3B. In other words, a gap G4 is formed between the cover plate 10 and the adhesive 20, depending on design requirements. A portion of the spacer 70 adjacent the working panel 50 is disposed between the panel 56 and the optical film assembly 62, even a portion of the spacer 70 may be extended between the polarization layer 58 and the optical film assembly 62 to separate the working panel 50 and the backlight module 60 for a gap G1 to prevent the working panel 50 and the backlight module 60 from colliding with each other, depending on design requirements. A portion of the spacer 70 far from the working panel 50 is disposed on the outer surface 45 of the side wall 44 of the frame 40. Furthermore, a portion of the spacer 70 is exposed from the electronic device 1 in FIGS. 3A and 3B, so the portion of the spacer 70 may act as an apparatus element to achieve decorative function.

The side wall 44 of the frame 40 may have at least one layer. As a result, if the side wall 44 has more than one layer, the strength of the side wall 44 may be strengthen to further protect the working module 100. The length (e.g. in X or Z direction) of different layers of the side wall 44 is not limited. The side wall 44 may include a sub-side wall 44A (first sub-side wall) and a sub-side wall 44B (second sub-side wall). In this embodiment, the sub-side wall 44A extends from the back plate 42 in a first direction (e.g. Z direction), and the sub-side wall 44B extends from an end of the sub-side wall 44A in a second direction (e.g. −Z direction), and the first direction is parallel to the second direction. In the present disclosure, the sub-side wall 44B has a length L1 in the first direction (e.g. Z direction) measured from an uppermost end to a bottom end of the sub-side wall 44B, the sub-side wall 44A has a length L2 in the first direction (e.g. Z direction) measured from an uppermost end to a bottom end of the sub-side wall 44A, and the length L1 is less than the length L2. The back plate 42 includes a surface 46 facing away from the working panel 50, and a distance D1 is formed between the extension line LL of the surface 46 and the bottom end of the sub-side wall 44B that is far from the cover plate 10 in the first direction (e.g. Z direction) to prevent the sub-side wall 44B extending beyond the extension line LL, so user may be prevented from injured by touching the sub-side wall 44B. In this embodiment, the distance D1 is greater than 0.2 mm, but the present disclosure is not limited thereto.

Furthermore, the sub-side wall 44A is formed integrally with the sub-side wall 44B as one piece, wherein the sub-side wall 44B is extended from the sub-side wall 44A, and the sub-side wall 44B is formed by bending the sub-side wall 44A. The outer surface 45 of the sub-side wall may not be in direct contact with the surface 47 of the sub-side wall 44B (the normal vector of the surface 47 is not oriented to the working panel 50), and the extension direction of the outer surface 45 is parallel to the extension of the surface 47. In an embodiment, the adhesive 20 covers at least 50% area of the surface 47 of the sub-side wall 44B. In another embodiment, the length SL of the adhesive 20 may be greater than or equal to half of the length L1 of the sub-side wall 44B in the first direction when viewed in the cross-sectional view. It should be noted that the sub-side wall 44A may be in direct contact with the sub-side wall 44B. In other words, no gap is formed between the sub-side wall 44A and the sub-side wall 44B, so the length (in X direction when viewed in the cross-sectional view) of the electronic device 1 may be reduced. In some embodiments, a gap may be formed between the sub-side wall 44A and the sub-side wall 44B to compensate the influence of the tolerance generated during manufacturing. Moreover, if the side wall 44 has more than one layer, then the total thickness W2 of the side wall 44 may be greater than the thickness W1 of the back plate 42. In this embodiment, the thickness W21 of the sub-side wall 44A, the thickness W22 of the sub-side wall 44B and the thickness W1 of the back plate 42 are identical, but is not limited thereto. In this embodiment, the total thickness W2 of the sub-side wall 44A and the sub-side wall 44B is the thickness W21 plus the thickness W22.

Figure 5A:
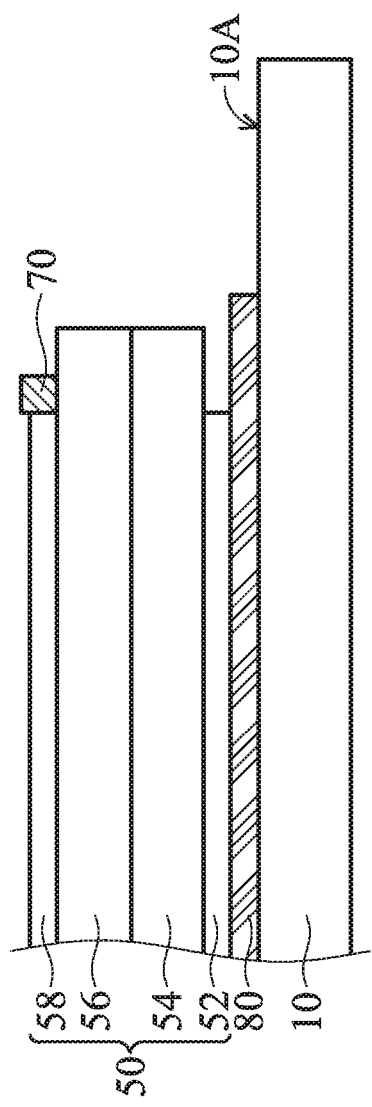
FIGS. 5A to 5F are schematic views of a method for manufacturing an electronic device in some embodiments of the present disclosure.
Figure 5B:
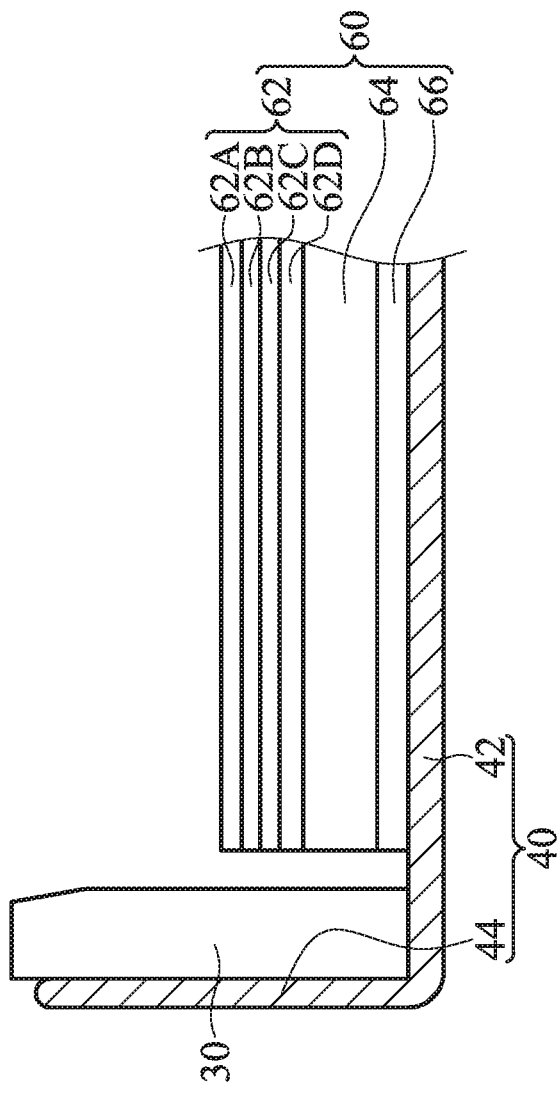
Figure 5C:
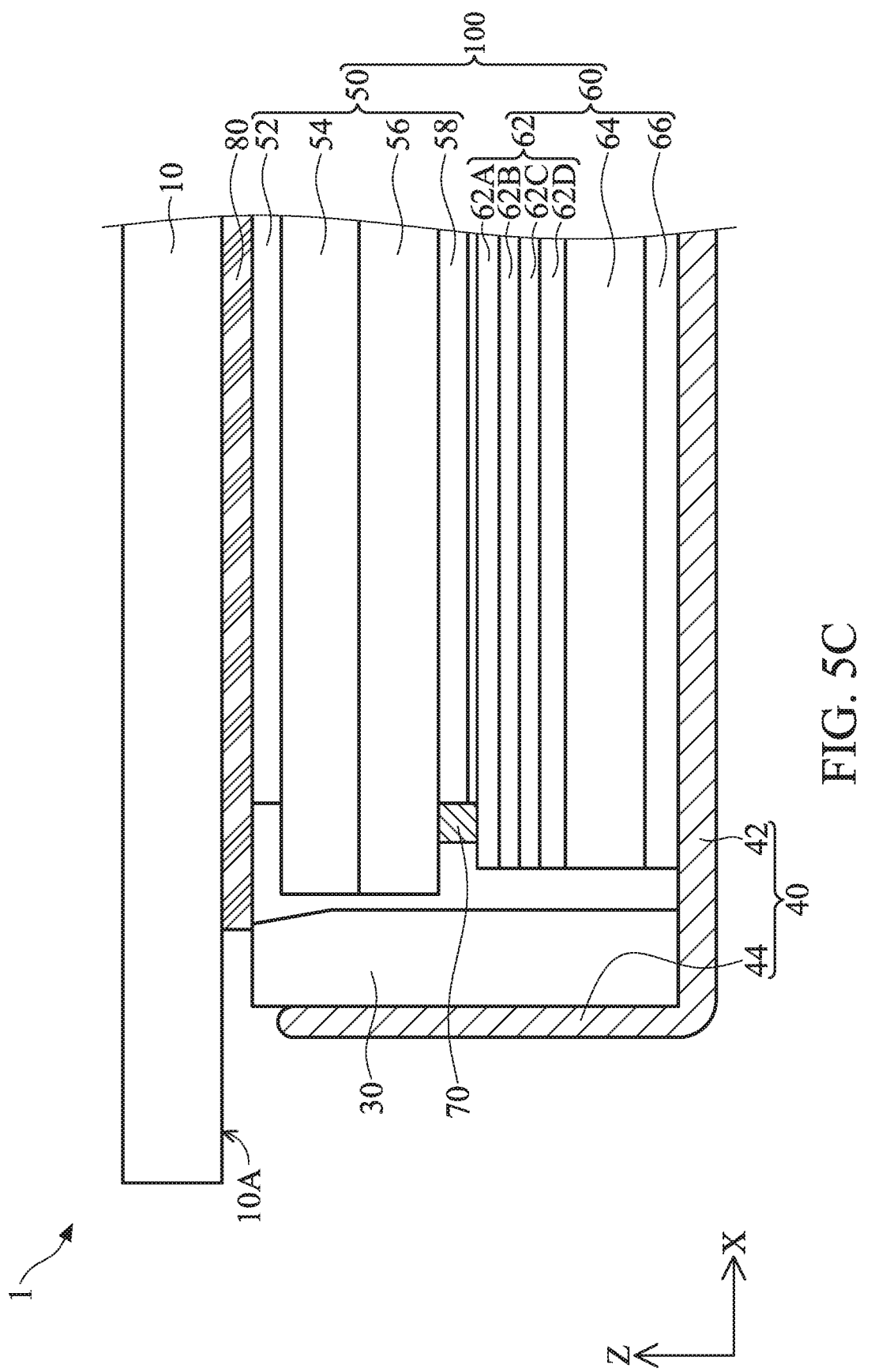
Figure 5D:
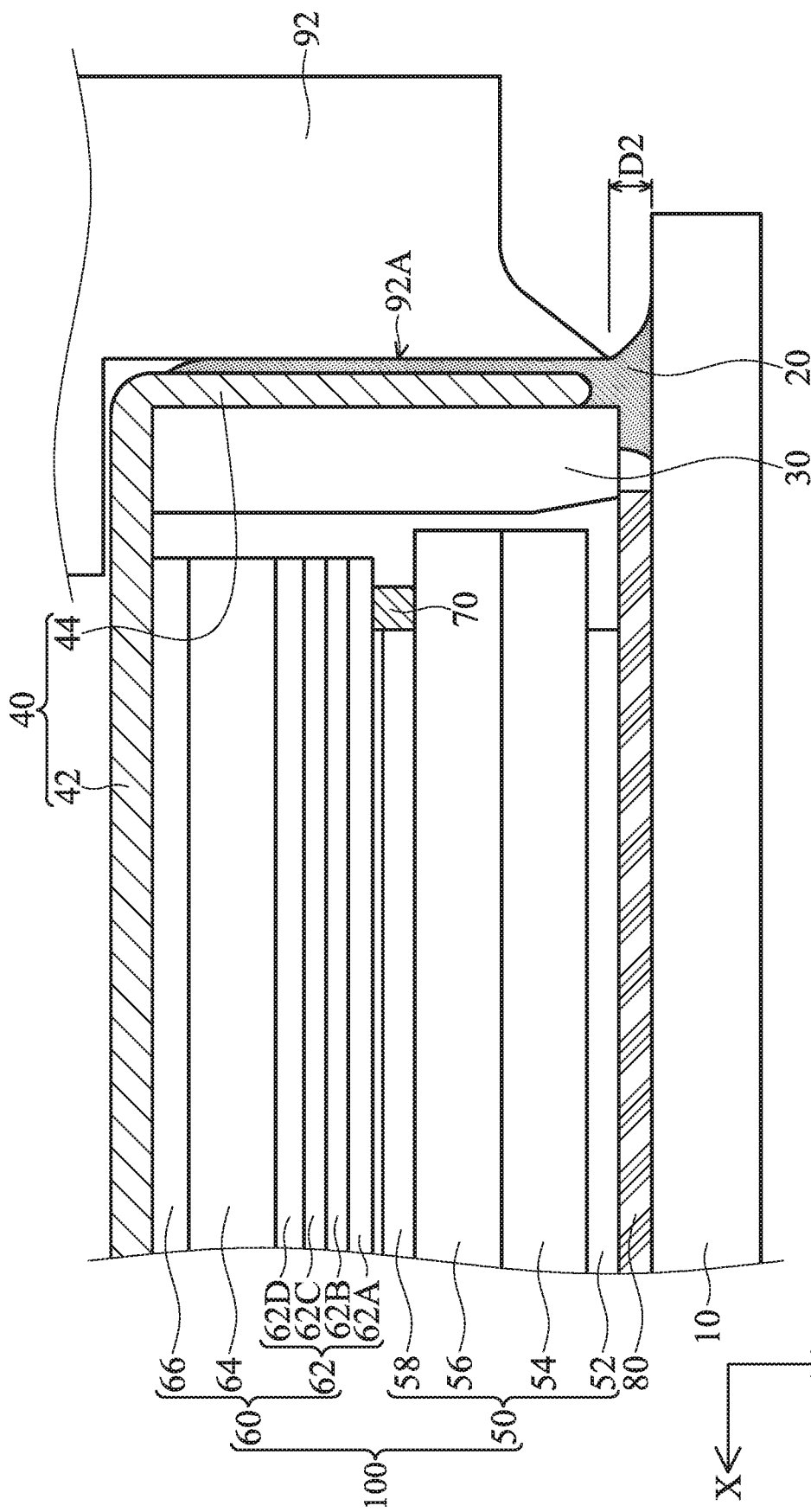
Figure 5E:
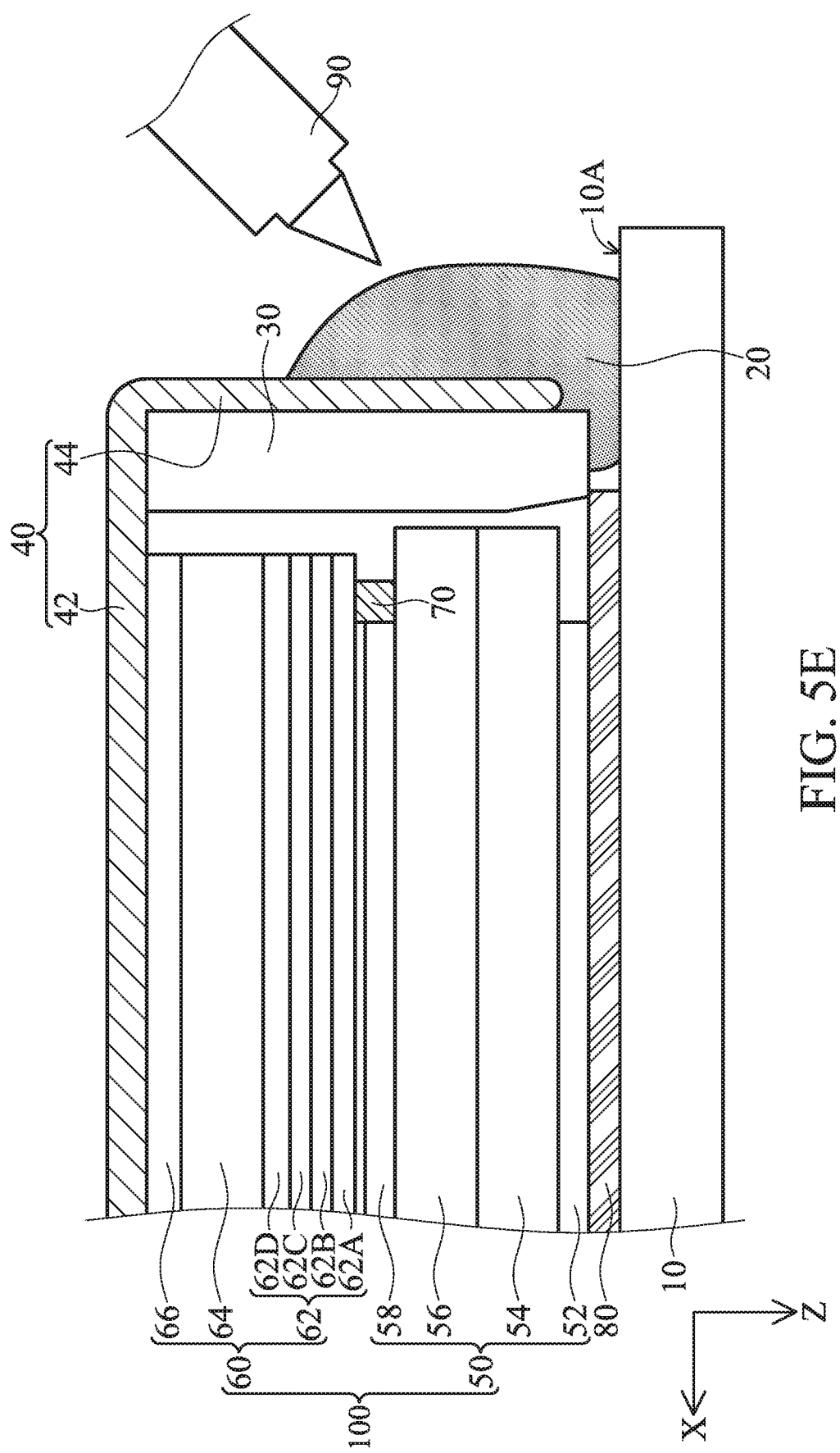

A detailed description of a method for manufacturing the aforementioned electronic device is provided. Please refer to FIGS. 5A to 5F. In FIG. 5A, the cover plate 10 is fixed to the working panel 50 that includes the panel 54, the panel 56, the polarization layer 58 and the polarizing layer 52 using the adhesive layer 80, and the spacer 70 may be disposed on the working panel 50 by an operator or by machine coating. In FIG. 5B, the case 30 and the backlight module 60 may be disposed in the frame 40 using tape, by engaging, or using hot melt fixing. In this step, the backlight module 60 may be assembled by stacking or a suitable adhesive may be provided to assemble the backlight module 60, and the present disclosure is not limited thereto. In FIG. 5C, the elements in FIG. 5A are inverted, i.e. the cover plate 10 is on the top, the working panel 50 is on the bottom and disposed on the elements shown in FIG. 5B to be assembled with each other. In FIG. 5D, the elements shown in FIG. 5C are inverted, and glue may be provided to the elements by knife coating. An apparatus for providing adhesive may include a scraper 92 and a channel in the scraper 92 (not shown) to provide the adhesive 20 on the electronic device, but the present disclosure is not limited thereto. In particular, when the adhesive 20 flows out from the channel, a surface 92A of the scraper 92 contacts the adhesive 20, and a distance D2 may be formed between the cover plate 10 and an end of the scraper 92 that is adjacent to the cover plate 10 to prevent the scraper 92 from directly contacting the cover plate 10. In the present disclosure, the distance D2 is between about 0.1 mm and about 0.4 mm, but is not limited thereto. Furthermore, as shown in FIG. 5E, the apparatus for providing adhesive may include a dispensing needle 90 to provide the adhesive 20 by dispensing, depending on design requirements. As a result, adhesive 20 provided by different methods have different section, wherein a portion of the adhesive 20 that is far from the cover plate 10 in FIG. 5D has a slender shape, and a portion of the adhesive 20 that is adjacent to the cover plate 10 has a concave curved surface. The adhesive 20 in FIG. 5E has a convex curved surface.

Figure 5F:
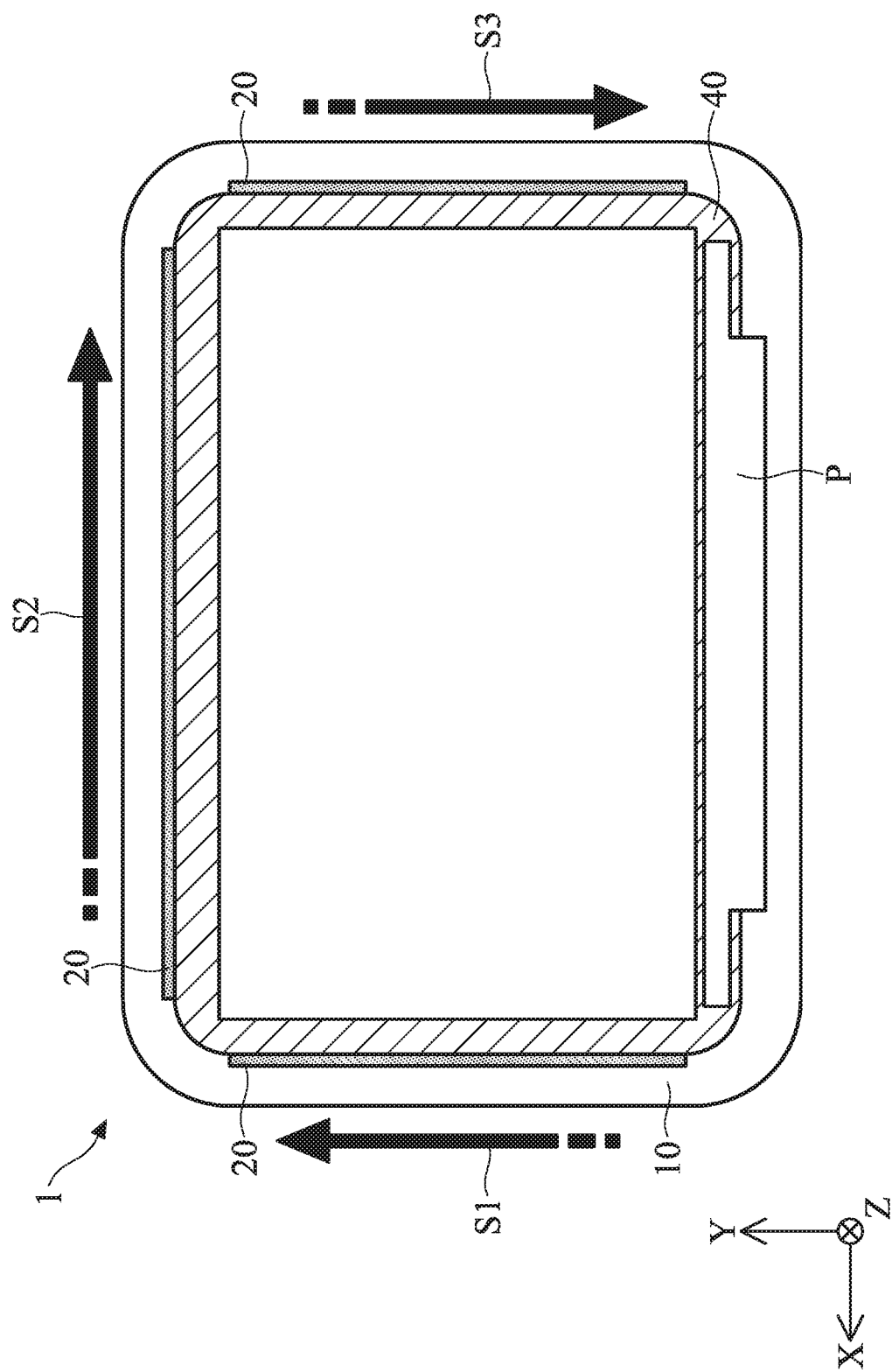

The adhesive 20 may be provided by any suitable sequence and method. For example, FIG. 5F is a top view when the adhesive 20 is provided on the electronic device 1. In FIG. 5F, when the cover plate 10 and the frame 40 are rectangular and the corners of the cover plate 10 and the frame 40 are arc-shaped, the adhesive 20 is provided in a clockwise manner by the sequences S1, S2 and end at the sequence S3. Furthermore, the adhesive 20 may be provided in a counterclockwise manner, but the present disclosure is not limited thereto. In other embodiments, the starting point may be adjusted according to the shape of the electronic device 1, and is not limited in the present disclosure. Moreover, a plurality of apparatuses may be used to simultaneously provide the adhesive 20 on the side wall 44 of the frame 40 of the electronic device 1, and the present disclosure is not limited thereto. Furthermore, the adhesive 20 may be provided from various direction (e.g. a direction that has 45 degree angles to the cover plate 10), depending on design requirements.

Figure 6A:
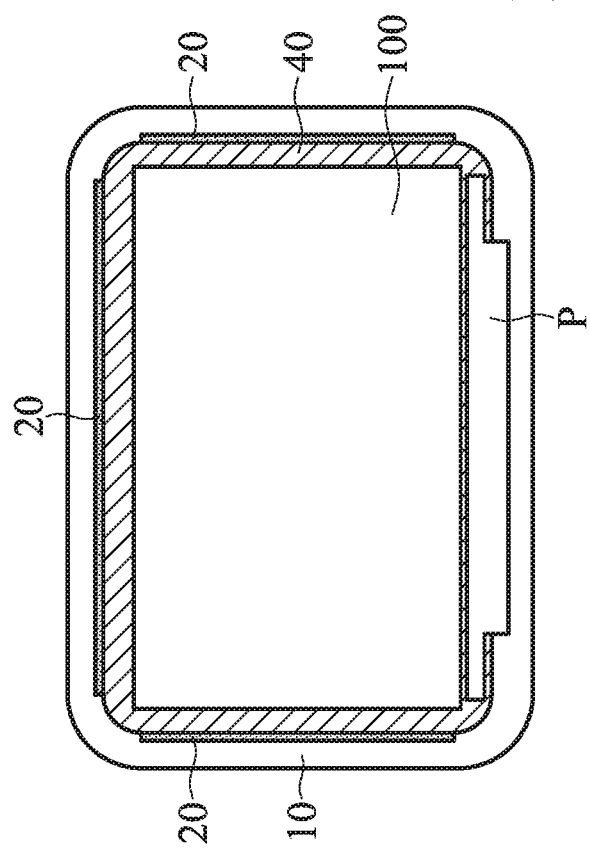
FIG. 6A is a cross-sectional view of an electronic device in some embodiments of the present disclosure.
Figure 6B:
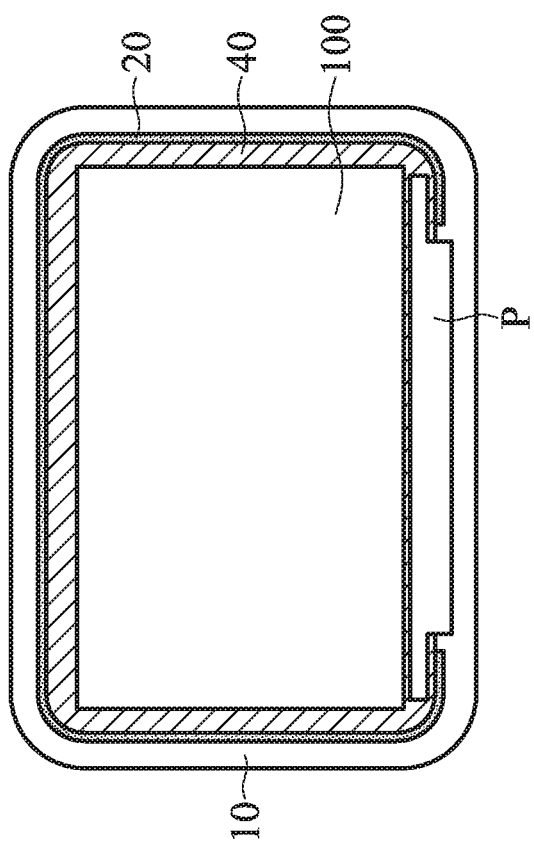
FIG. 6B is a cross-sectional view of an electronic device in some embodiments of the present disclosure.

In FIG. 5F, the adhesive 20 may be disposed surrounding the electronic device 1 discontinuously or continuously, but is not limited thereto, and may be changed to meet design requirements. In the embodiment shown in FIG. 1, the adhesive 20 is disposed on a straight portion of the frame 40 and a gap G3 is formed between the adhesive 20 and the circuit board P. In another embodiment, as shown in FIG. 6A, the adhesive 20 may also be in direct contact with the circuit board P, and the present disclosure is not limited thereto. In a further embodiment, as shown in FIG. 6B, the adhesive 20 may be provided on the frame 40 continuously.

In summary, an electronic device and a method for forming an electronic device are provided in the embodiments of the present disclosure. By attaching the frame and the cover plate of the electronic device by the adhesive, the process may be simplified, is beneficial for automatic manufacturing, and electronic device having narrow frame may be achieved.

The electronic device made in the embodiments of the present disclosure may have touch control function to act as a touch electronic device. Furthermore, the electronic device or touch electronic device may be applied in any electronic device that requires a screen, such as display, mobile phone, watch, notebook, video camera, photographic camera, mobile navigator, television, etc. However, the devices are merely examples, and the applications of the present disclosure are not limited thereto. The touch electronic device in the embodiments of the present disclosure may also be used in an antenna having touch control function or other electronic devices.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An electronic device, comprising:
   a frame comprising a side wall, wherein the side wall has an outer surface;
   a working panel, wherein at least a portion of the working panel is disposed in the frame;
   a cover plate, which is disposed on the working panel and which has a surface; and
   a case disposed in the frame;
   wherein the surface of the cover plate and the outer surface of the side wall of the frame are fixed by using an adhesive, and an extension direction of the surface of the cover plate is different from an extension direction of the outer surface of the side wall,
   wherein at least a portion of the case is in contact with at least a portion of the adhesive.

2. The electronic device as claimed in claim 1, wherein the surface of the cover plate has a normal direction, and a thickness of the adhesive that is in contact with the surface of the cover plate is greater than a thickness of the adhesive that is in contact with the outer surface of the side wall of the frame in a direction that is perpendicular to the normal direction.

3. The electronic device as claimed in claim 1, wherein a length of the adhesive is greater than or equal to 50% of a length of the outer surface of the side wall in a cross-sectional view.

4. The electronic device as claimed in claim 1, wherein the side wall of the frame comprises:
   a first sub-side wall extending in a first direction; and
   a second sub-side wall connected to the first sub-side wall and extending in a second direction, wherein the first direction is opposite to the second direction.

5. The electronic device as claimed in claim 4, wherein a length of the second sub-side wall is less than a length of the first sub-side wall in the first direction.

6. The electronic device as claimed in claim 1, wherein an extension line extends along the outer surface, and the adhesive comprises:
   a first portion positioned at a side far from the working panel; and
   a second portion positioned at a side adjacent to the working panel, wherein the first portion and the second portion are positioned at opposite sides of the extension line.

7. The electronic device as claimed in claim 6, wherein a thickness of the second portion that is in contact with the surface of the cover plate is between 0.1 mm and 1.0 mm.

* * * * *